United States Patent
Björnsson et al.

(10) Patent No.: US 10,252,771 B2
(45) Date of Patent: Apr. 9, 2019

(54) CLIPLESS BICYCLE PEDAL ADAPTER WITH LIVING HINGES

(71) Applicant: K88 ehf., Reykjavik (IS)

(72) Inventors: Karl Birgir Björnsson, Reykjavik (IS); Ragnar Örn Gunnarsson, Reykjavik (IS)

(73) Assignee: K88 ehf., Reykjavik (IS)

(*) Notice: Subject to any disclaimer, the term of this patent is extended or adjusted under 35 U.S.C. 154(b) by 0 days.

(21) Appl. No.: 15/809,854

(22) Filed: Nov. 10, 2017

(65) Prior Publication Data

US 2018/0154979 A1 Jun. 7, 2018

Related U.S. Application Data

(60) Provisional application No. 62/420,236, filed on Nov. 10, 2016.

(51) Int. Cl.
*B62M 3/08* (2006.01)
*B62M 3/16* (2006.01)

(52) U.S. Cl.
CPC ............ *B62M 3/08* (2013.01); *B62M 3/083* (2013.01); *B62M 3/086* (2013.01); *B62M 3/16* (2013.01)

(58) Field of Classification Search
CPC .......... B62M 3/08; B62M 3/086; B62M 3/16; Y10T 74/217; Y10T 74/2168; Y10T 74/20912; Y10T 74/2172; Y10T 74/2164
See application file for complete search history.

(56) References Cited

U.S. PATENT DOCUMENTS

| | | | | |
|---|---|---|---|---|
| 2,548,988 A * | 4/1951 | McDonald | ............... | B62M 3/08 74/563 |
| 2,751,797 A * | 6/1956 | Pearl | ....................... | B62M 3/08 74/563 |
| 3,859,867 A * | 1/1975 | Haines | ..................... | B62M 3/08 74/563 |
| 4,345,487 A * | 8/1982 | Straker | .................... | B62M 3/08 74/563 |
| 5,203,229 A | 4/1993 | Chen | | |
| 5,685,202 A | 11/1997 | Chen | | |
| 5,697,262 A | 12/1997 | Chen | | |
| 5,737,977 A | 4/1998 | Surdi et al. | | |

(Continued)

FOREIGN PATENT DOCUMENTS

EP    0485956 A1    5/1992
EP    0516013 A2    12/1992

(Continued)

*Primary Examiner* — Patrick Cicchino
(74) *Attorney, Agent, or Firm* — Thorpe North & Western, L.L.P.

(57) ABSTRACT

A clipless pedal platform adapter can include first and second platforms. Each platform can have an outer side to interface with a user's foot and an inner side to interface with a clipless pedal, the inner sides facing one another. First and second side members can also be pivotally coupled to the first and second platforms at opposite ends of the platforms such that a distance between the platforms is variable. The first and second platforms and the first and second side members can define a pedal opening to receive the pedal. The first and second platforms can be biased toward one another to force the inner sides against the pedal thereby coupling the clipless pedal platform adapter to the pedal.

25 Claims, 11 Drawing Sheets

(56) References Cited

U.S. PATENT DOCUMENTS

| | | | |
|---|---|---|---|
| 5,931,053 A | | 8/1999 | Chen |
| 6,128,973 A | * | 10/2000 | Nagano ................. B62M 3/086 |
| | | | 403/24 |
| 6,196,084 B1 | | 3/2001 | Ueda |
| 6,640,663 B1 | | 11/2003 | Steinberg |
| 6,722,229 B2 | | 4/2004 | Muraoka |
| 7,013,754 B2 | | 3/2006 | Milanowski |
| 7,743,682 B2 | | 6/2010 | Couturet et al. |
| 9,003,921 B2 | | 4/2015 | Weagle |
| 9,090,309 B2 | | 7/2015 | Swift |
| 2003/0029270 A1 | | 2/2003 | Milanowski |
| 2005/0155452 A1 | | 7/2005 | Frey |
| 2006/0075664 A1 | | 4/2006 | Muraoka |
| 2012/0048061 A1 | | 3/2012 | Lin |
| 2014/0060242 A1 | | 3/2014 | Thom et al. |
| 2016/0021970 A1 | | 1/2016 | Bryne |
| 2017/0334511 A1 | * | 11/2017 | Lin ........................ B62M 3/086 |

FOREIGN PATENT DOCUMENTS

| | | |
|---|---|---|
| EP | 0604400 A2 | 6/1994 |
| EP | 1533218 A2 | 5/2005 |
| EP | 2623409 A1 | 8/2013 |
| WO | WO03/011681 A1 | 2/2003 |
| WO | WO2016/025966 A1 | 2/2016 |
| WO | WO2016/036765 A1 | 3/2016 |

* cited by examiner

CLIPLESS BICYCLE PEDAL ADAPTER WITH LIVING HINGES

RELATED APPLICATION

This application claims the benefit of U.S. Provisional Patent Application Ser. No. 62/420,236, filed on Nov. 10, 2016, which is incorporated herein by reference.

BACKGROUND

Platform bicycle pedals are flat-surfaced pedals used on a variety of bicycles, typically for casual and mountain bike use. Here, the rider's force is only applied in a downwards direction on the pedals when cycling. Clipless bicycle pedals are intended for a cyclist to be more efficient when cycling by providing a better foot-to-pedal connection. Such pedals are comprised of special pedals and cleats, whereby the cleats are attached to the sole of specialized bicycling shoes that attach to the clipless pedals. Because the clipless pedal is attached to the rider's shoe, force is applied by pulling one pedal upwards while pushing the other downwards, simultaneously. Clipless pedals are typically used for more competitive purposes where riders aim to energy-efficiently maximize their performance, such as in bicycle races, long-distance endurance rides or competitive mountain bike rides.

While clipless pedals have many benefits over platform pedals, they are typically unsuitable for casual rides. The cleat-to-clipless pedal system works best when the rider is continuously in motion, without needing to stop abruptly. Rides that are not ideally suited for the clipless pedal systems may include bike rides in crowded urban areas or in traffic, family bike rides or mountain bike rides over difficult terrain, such as slippery or rocky surfaces. Some of these situations may be risky for riders who may be unable to disengage themselves from the clipless pedals quickly enough in the event of unforeseen hazardous circumstances. Such an instance may include commuters crossing riders' paths, who must stop abruptly and place their feet on the ground to prevent themselves from falling. Riders who fail to react quickly and appropriately in such circumstances may suffer injuries, such as a broken collar bone when falling, or injure others in their path. This is especially relevant for mountain bike riders, who may be more likely to fall and suffer serious injuries as a result of being attached to their clipless pedals when riding over difficult terrain. Many mountain bike riders who use clipless pedals, in particular amateur riders, may see a benefit in changing their clipless pedals to platform pedals in potentially hazardous situations. In other circumstances, the use of clipless pedals is simply impractical, often because the rider must wear specialized shoes that are not suited for walking. Here, platform pedals are superior, especially when the destination requires the rider to move around on foot on normal shoes.

Some riders may solve these problems by owning multiple bicycles, each with different types of platform and clipless pedals. However, bicycles that use clipless pedals are typically intended for more competitive, or endurance-related, purposes and are therefore commonly more expensive than standard commuter bikes. It is therefore not within everyone's means to own multiple bicycles for different purposes. While changing pedals is an option, it is a time consuming process that requires a specific set of tools and considerable effort. For these reasons, riders are typically unlikely to opt for this method. Alternatively, riders may choose to wear normal shoes on a bicycle fitted with clipless pedals. However, because clipless pedals are not intended for this purpose, they provide little traction for normal shoes, which will easily slip, particularly in wet conditions. Wearing normal shoes while riding on clipless pedals will result in an uncomfortable ride, where the rider may feel out of balance and insecure.

Several clipless pedal adapters have been created in the past in order to address this problem. However, such clipless pedal adapters have various drawbacks. For example, most clipless adapters are specially designed for a particular type of clipless pedal, and therefore a narrow segment of clipless pedal users. Other adapters approach a solution with a combination of a clipless pedal and a platform pedal. While this approach solves the issue of traction on clipless pedals, the device is not an adapter, but rather a modified pedal that is fitted on the bike permanently. Some of these types of clipless-platform pedal combinations have the problem of unequal weight distribution; therefore, the rider is only presented with one side of the pedal to engage with. Lastly, riders typically enjoy the benefits of their clipless pedals and may not wish to have a permanent platform adapter attached to their bicycles.

SUMMARY

A simple, quick, inexpensive and compact pedal adapter can present the rider with two platform sides when riding and is not limited in use to one particular type of clipless pedal. A clipless pedal platform adapter is disclosed that can comprise first and second platforms. Each platform can have an outer side to interface with a rider's shoe and an inner side to interface with a clipless pedal system, with the inner sides of the adapter facing one another. Two side members can be pivotally coupled to the first and second platforms at opposite ends of the platforms such that the distance between the platforms is variable. The first and the second platforms and the first and the second side members can define a pedal opening to receive the clipless pedal. The first and second platforms can be biased towards one another to force the inner sides against the clipless pedal, where the force may be applied via living hinges, thereby coupling the clipless pedal platform adapter to the clipless pedal. To ensure that the clipless pedal platform adapter is held in place, pedal engagement features may interface with the clipless pedal's shoe coupling features. In one aspect, a clipless pedal platform adapter is disclosed that is coupled to a clipless pedal.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

FIG. 1b is a side view of the clipless pedal platform adapter of FIG. 1a.

Figure 1A:
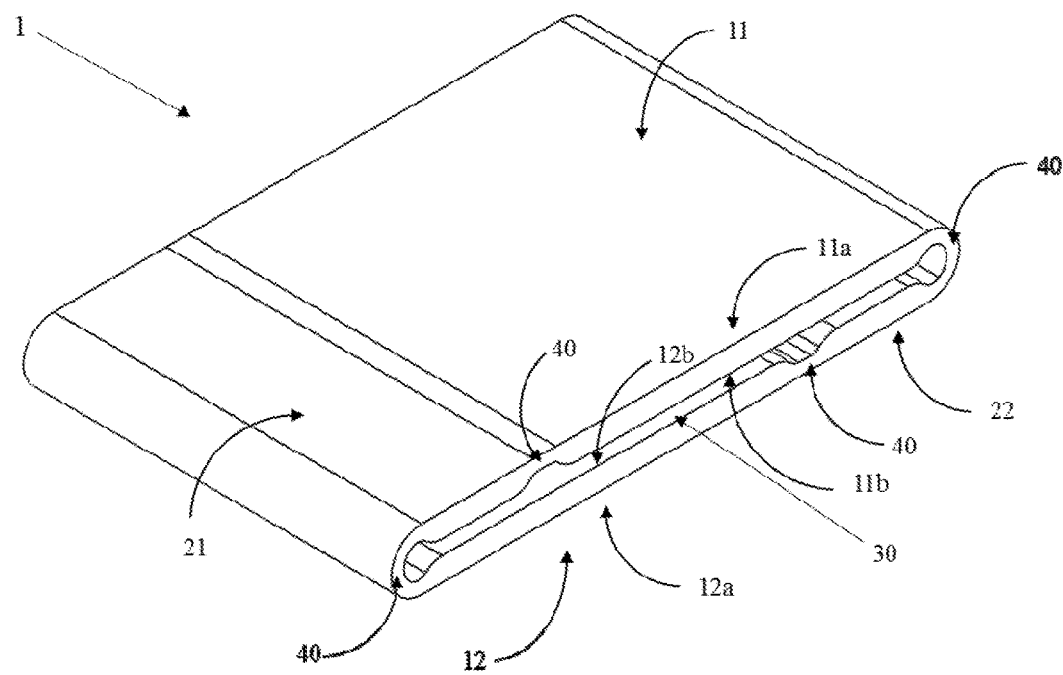
FIG. 1a is a perspective view of a clipless pedal platform adapter in accordance with an example of the present disclosure, shown in an undeflected configuration.

These drawings are provided to illustrate various aspects of the invention and are not intended to be limiting of the scope in terms of dimensions, materials, configurations, arrangements or proportions unless otherwise limited by the claims. Additionally, from figure to figure, the same reference numerals have been used to designate the same components of an illustrated embodiment.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a protrusion" includes reference to one or more of such protrusions and reference to "the recess" refers to one or more such recesses.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, and combinations of each.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Clipless Bicycle Pedal Adapters

The invention can provide a simple, quick, inexpensive and compact pedal adapter that presents the rider with two platform sides when riding and is not limited in use to one particular type of clipless pedal.

Referring initially to FIGS. 1a-3b, a clipless pedal platform adapter 1 is illustrated in accordance with an example of the present disclosure. The clipless pedal platform adapter 1 comprises a first platform 11 and a second platform 12. Each platform has an outer side 11a, 12a to interface with a rider's shoe and an inner side 11b, 12b to interface with a clipless pedal system, with the inner sides facing one another. The clipless pedal platform adapter 1 also includes side members 21, 22. The side members 21, 22 are pivotally coupled at 40 to the first and second platforms 11, 12 at opposite ends of the platforms. The first and second platforms 11, 12 and the first and second side members 21, 22 can define a pedal opening 30 to receive a clipless pedal (see FIGS. 5b, 6b, 7b and 8b). The pivotal couplings 40 enable a distance 31 (see FIGS. 1b, 2b, and 3b) between the platforms 11, 12 to be variable, which enables a size of the pedal opening 30 to be variable. FIGS. 1a-3b show various configurations of the clipless pedal platform adapter 1 with the pedal opening 30 at different sizes.

In one aspect, the first and second platforms 11, 12 can be biased toward one another, tending to reduce the distance 31 and therefore reduce the size of the pedal opening 30. This tendency to reduce the distance 31 and the size of the pedal opening 30 can facilitate coupling the clipless pedal platform adapter 1 to a clipless pedal. For example, the first and second platforms 11, 12 can be biased toward one another to force the inner sides 11b, 12b of the platforms against a clipless pedal, thereby coupling the clipless pedal platform adapter 1 to the clipless pedal. The first and second platforms 11, 12 can be biased toward one another in any suitable manner utilizing any suitable device or construction. In some embodiments, the first and second platforms 11, 12 can be biased toward one another by the pivotal couplings 40. For example, at least one of the first and second side members 21, 22 may be pivotally coupled to at least one of the first and second platforms 11, 12 via a pivotal coupling 40 configured as a living hinge that biases the first 11 and second 12 platforms toward one another. A living hinge can act as a spring, which provides a force when deflected. The living hinges 40 can therefore be configured to provide biasing force drawing the first and second platforms 11, 12 together sufficient to facilitate coupling the clipless pedal platform adapter 1 to a pedal. In some embodiments, the thickness of the living hinges 40 can be approximately 0.5 mm to 15 mm, or in one more specific example, the thickness can range from 1.0 mm to 7.5 mm, and in yet another example from 1.5 mm to 3.5 mm.

Although the pivotal couplings 40 are shown and described herein with particular reference to living hinge configurations, it should be recognized that the pivotal couplings can be of any suitable type or configuration (e.g., a hinge including a pin and knuckles). In addition, biasing force on the first and second platforms 11, 12 can be provided by any suitable device or construction (e.g., a separate spring, a spring incorporated with a hinge, etc.).

Figure 1B:
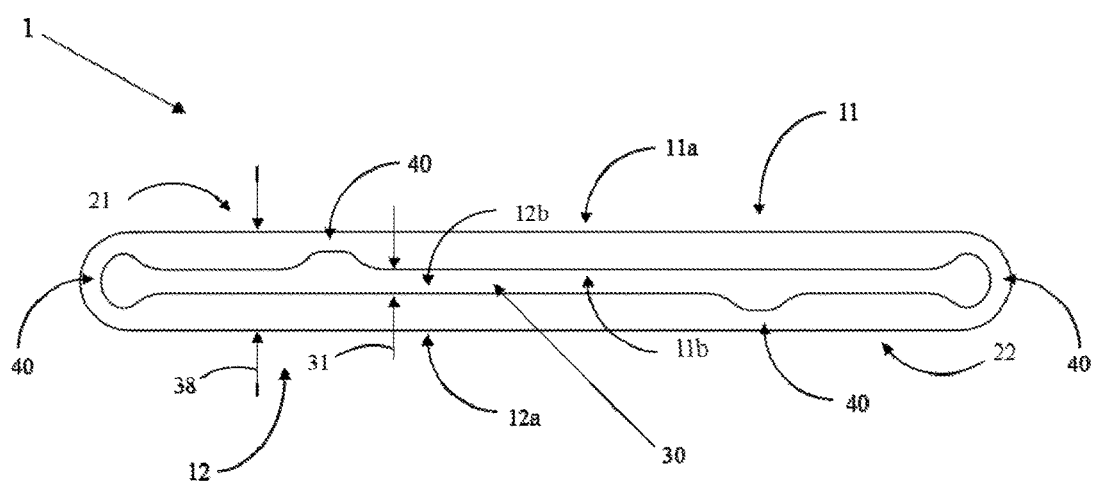

FIGS. 1a and 1b show the clipless pedal platform adapter 1 in an undeflected configuration where the distance 31 between the first and second platforms 11, 12 and is minimized in a free, unstressed state. In one aspect, the first side member 21 and the first platform 11 may be oriented at an angle greater than 90 degrees relative to one another in an undeflected, stress-free condition. For example, as shown in FIGS. 1a and 1b, the first platform 11 and the first side member 21 can be coplanar and oriented at an angle of 180 degrees relative to one another by the living hinge 40 in an undeflected condition. In this case, the living hinge 40 may have a straight configuration in an undeflected condition such that the first side member 21 and the first platform 11 are coplanar. The second side member 22 and the second platform 12 may be similarly coupled to one another by a living hinge 40. Moreover, the first side member 21 and the second platform 12 may be oriented at an angle less than 90 degrees relative to one another by a living hinge 40 in an undeflected condition. In this case, a living hinge 40 may have a curved configuration in an undeflected condition. The curved configuration of a living hinge 40 may be a semi-circular configuration that orients the first side member 21 and the second platform 12 parallel to one another. The second side member 22 and the first platform 11 may be similarly coupled to one another by a living hinge 40. The result may be a "flat" undeflected configuration that can reduce space occupied by the clipless pedal platform adapter 1 and therefore facilitate storage and transport of the clipless pedal platform adapter 1 when not in use.

Figure 2A:
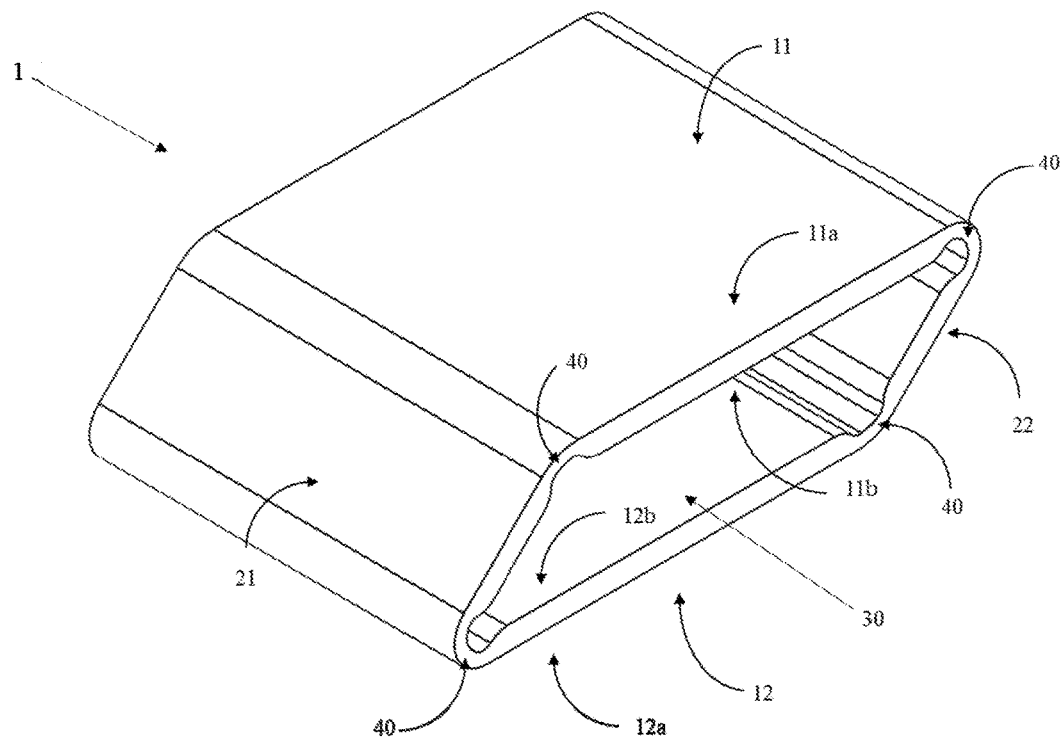
FIG. 2a is a perspective view of the clipless pedal platform adapter of FIG. 1a in a partially deflected configuration.
Figure 2B:
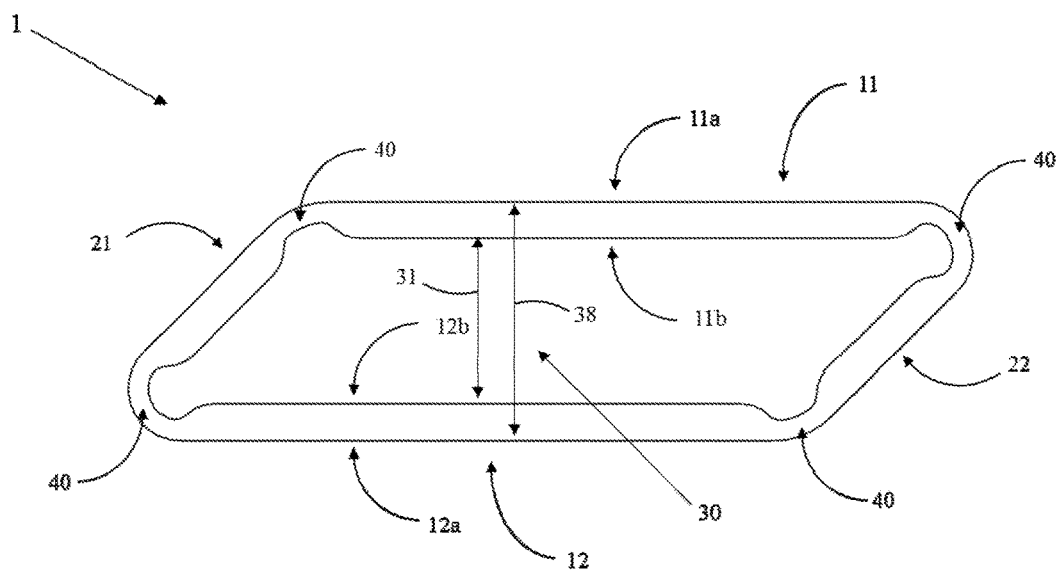
FIG. 2b is a side view of the clipless pedal platform adapter of FIG. 1a in a partially deflected configuration.

FIGS. 2a and 2b show the first and second platforms 11, 12 and the first and second side members 21, 22 of the clipless pedal platform adapter 1 in a partially deflected configuration, although it should be recognized that the clipless pedal platform adapter 1 can be configured such that FIGS. 2a and 2b represent a free, unstressed state.

Figure 3A:
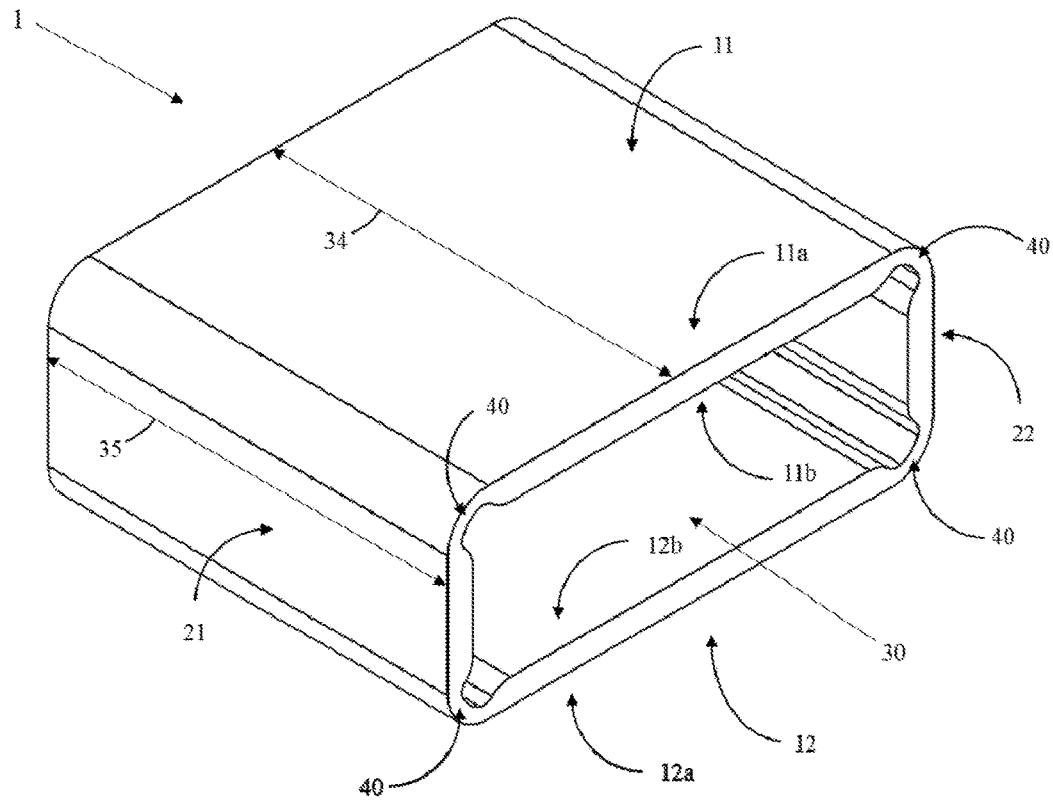
FIG. 3a is a perspective view of the clipless pedal platform adapter of FIG. 1a in a fully deflected configuration.
Figure 3B:
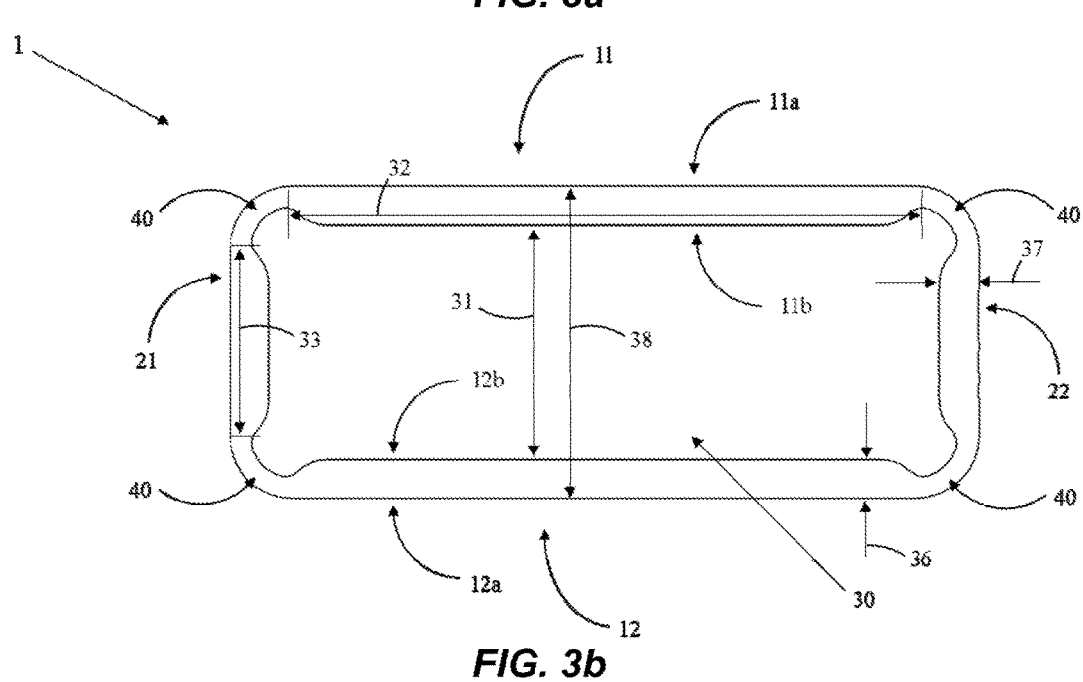
FIG. 3b is a side view of the clipless pedal platform adapter of FIG. 1a in a fully deflected configuration.

FIGS. 3a and 3b show the clipless pedal platform adapter 1 in a fully deflected configuration where the distance 31 between the first and second platforms 11, 12 is maximized. In this case, the first and second platforms 11, 12 and the respective first and second side members 21, 22 are oriented at an angle of 90 degrees relative to one another in a deflected condition. The variable distance 31 between the first and second platforms 11, 12 and the variable size of the pedal opening 30 can enable the insertion of a pedal within the pedal opening 30 and subsequent coupling of the pedal to the clipless pedal platform adapter 1 when the first and second platforms 11, 12 are biased toward one another into contact with the pedal.

The structure of the clipless pedal platform adapter 1 may be such that the first and second platforms 11, 12 are similar in length 32 (see FIG. 3b), approximately 50 mm to 140 mm, or in one more specific example, the length can range from 75 mm to 105 mm. In addition, the first and second side members 21, 22 may be similar in length 33 (see FIG. 3b), approximately 10 mm to 60 mm, or in one more specific example, the length can range from 20 mm to 40 mm. The clipless pedal platform adapter 1 can therefore have a parallelogram shape, although it should be recognized that the first and second platforms 11, 12 may have different lengths and/or the first and second side members 21, 22 may have different lengths such that the resulting shape is not a parallelogram.

The widths 34, 35 (see FIG. 3a) of the platforms 11, 12 and the side members 21, 22, respectively, can be of any suitable dimensions, such as approximately 60 mm to 120 mm, or in one more specific example, the width can range from 70 mm to 100 mm. The widths of the platforms 11, 12 and side members 21, 22 can be the same or different. In addition, the platforms 11, 12 and side members 21, 22 can have any suitable thickness 36, 37, respectively, such as approximately 0.5 mm to 15 mm, or in one more specific example, the thickness can range from 5 mm to 10 mm. The thicknesses of the platforms 11, 12 and side members 21, 22 can be the same or different.

The clipless pedal platform adapter's 1 height 38 (see FIG. 1b) when it is in an undeflected condition can be approximately 5 mm to 35 mm, or in one more specific example, the height can range from 10 mm to 25 mm. When in a partially or fully deflected condition, the clipless pedal platform adapter's 1 maximum height 32 (see FIGS. 2b and 3b) can range from approximately 5 mm to 70 mm, or in one more specific example, the maximum height can range from 8 mm to 60 mm. Specific dimensions of the clipless pedal platform adapter 1 can be varied based on a particular desired pedal compatibility, material strength, weight, durability, and other factors.

The various components of the clipless pedal adapter can be formed of any suitable material. For example, the side members 21, 22, the platforms 11, 12, and/or the living hinges 40 may be formed of a polymeric material (e.g., an elastomer, polyester, polyethylene, polypropylene, polyurethane, combinations thereof, etc.), a fiber reinforced composite material (e.g., carbon fiber, fiber glass, composites thereof, etc.), a metal material (e.g., steel, titanium, aluminum, magnesium, iron, chromium, nickel, manganese, combinations thereof, etc.), a magnetic material, etc., alone or in any combination.

In one aspect, two or more of the side members 21, 22, the platforms 11, 12, and the living hinges 40 may be integrally formed with one another (e.g. as a single continuous homogeneous piece). In another aspect, a living hinge 40 can be separately formed and secured to adjacent platforms and sides. For example, polymeric living hinges may be secured to metal or composite platforms and sides. Such securing can be accomplished via rivets, bolts, crimping, an interference fit, adhesive, or any other suitable fastening or coupling mechanism. In yet another example, the clipless pedal platform adapter can include an optional outer sleeve which encompasses outer surfaces of the adapter. For example, a sleeve can be formed about the adapter to provide texture, grip, or other features. In some examples, the sleeve can be a rubberized sleeve, although other polymeric materials can be used such as, but not limited to, thermoplastic elastomers, vinyls, silicones, and the like.

Figure 4A:
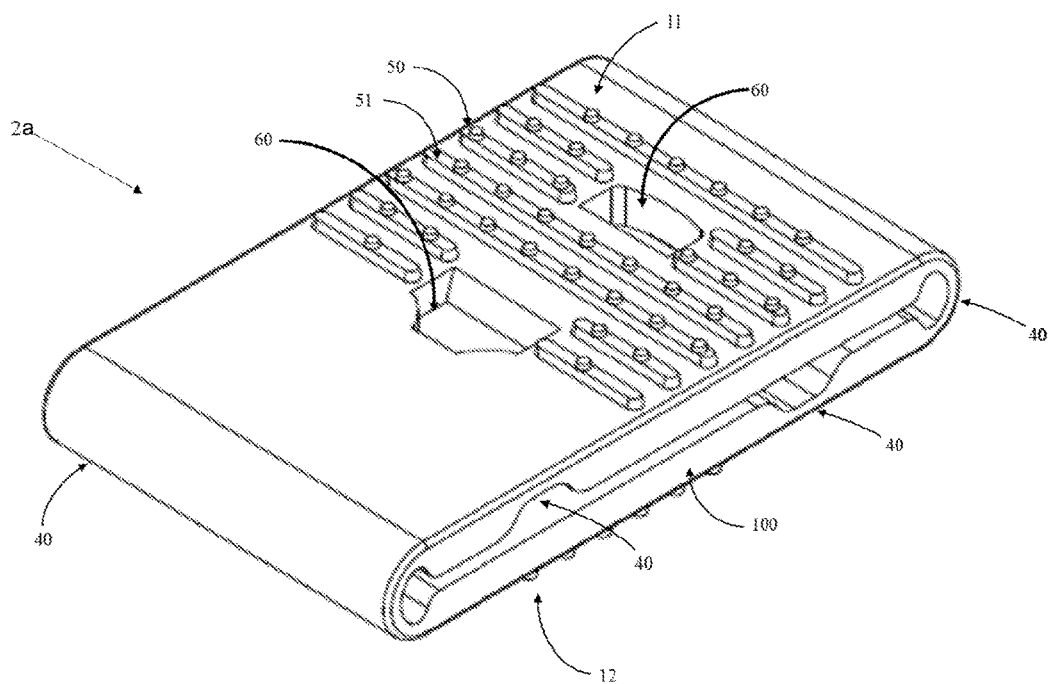
FIG. 4a is a perspective view of a clipless pedal platform adapter in accordance with an example of the present disclosure, shown in an undeflected configuration.
Figure 4B:
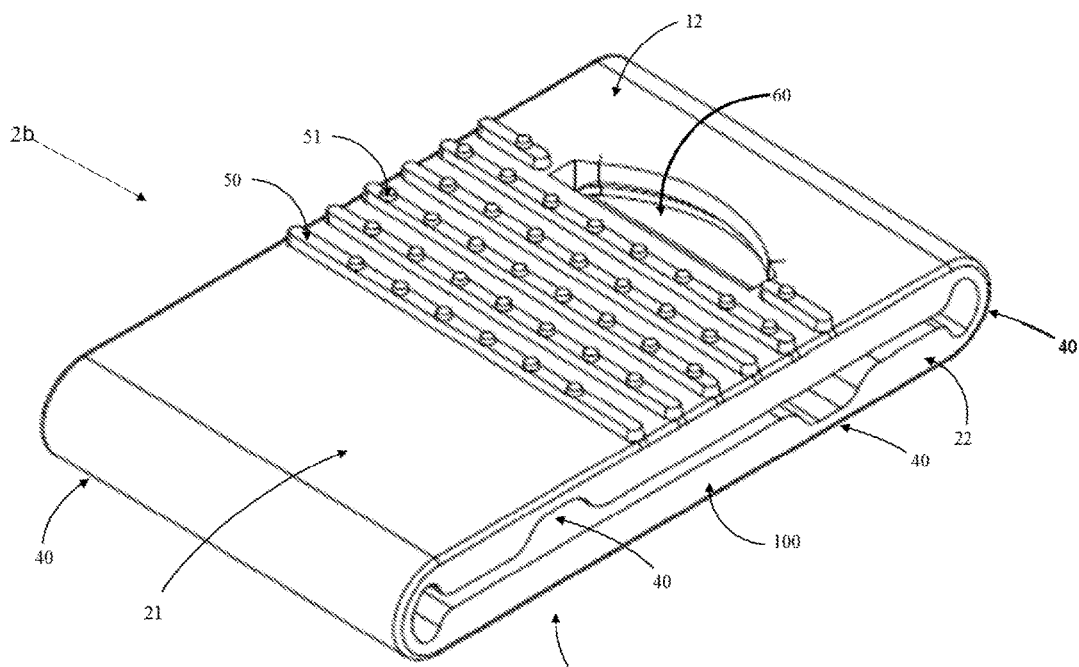
FIG. 4b is a perspective view of a clipless pedal platform adapter in accordance with another example of the present disclosure, shown in an undeflected configuration.
Figure 4C:
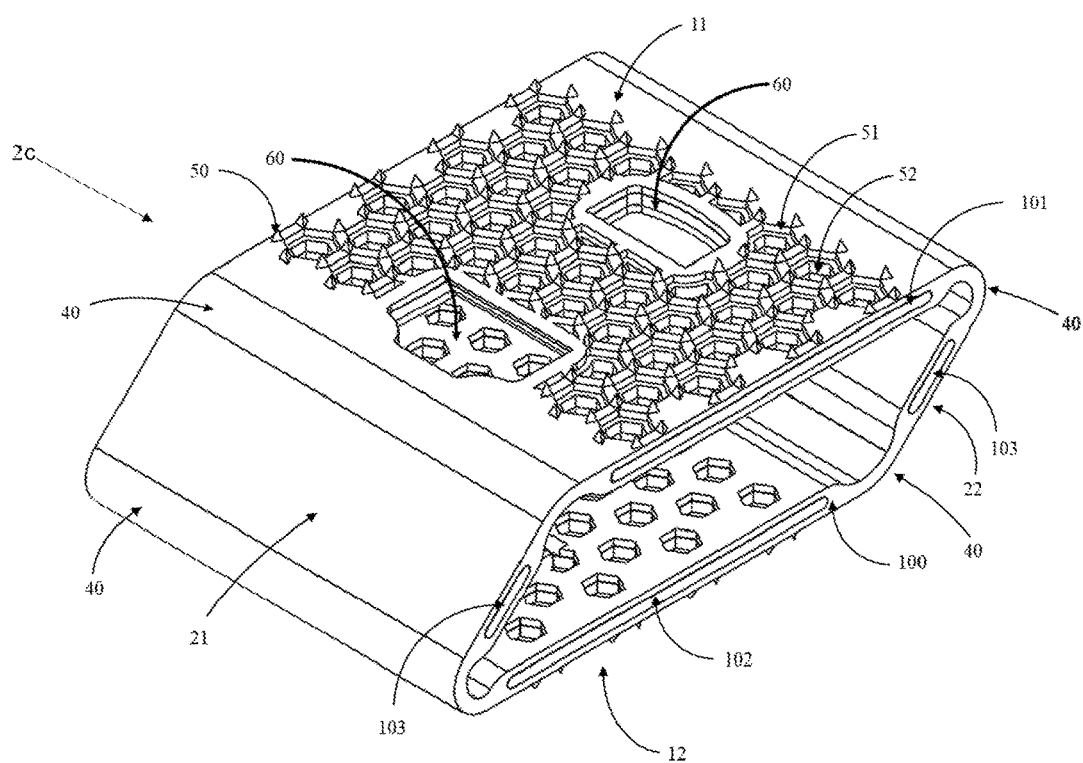
FIG. 4c is a perspective view of a clipless pedal platform adapter in accordance with an example of the present disclosure.

In some embodiments, an inflexible or rigid support plate structure can be included (e.g. FIG. 4c). However, as generally illustrated in FIGS. 4a and 4b, such support plate structure may be omitted, and the platforms and side members may be constructed of the same flexible material used to form living hinges 40. In this case, the platforms and side members can have increased thickness to provide the desired strength. FIG. 4a illustrates a clipless pedal platform adapter 2a in accordance with another example of the present disclosure. In this case, the outer sides of the first and second platforms 11, 12 can optionally comprise traction features 50 to interface with a shoe tread. The traction features 50 can comprise any suitable traction enhancing feature or material, such as protrusions 51 and/or recesses (not shown). A traction enhancing protrusion can have any suitable shape or configuration such as, but not limited to, buttons, spikes, mounds, pegs, and the like. In one aspect, protrusions can comprise buttons, as shown in FIG. 4a. Other traction features can optionally be used such as, but not limited to, non-skid grit, rubberized surfaces, and the like. Traction features and materials can be included in any combination and in any suitable arrangement on an outer side of the platforms 11, 12 and/or the side members 21, 22. In some embodiments, an outer side of one or more living hinges 40 can include a traction enhancing feature and/or material.

FIG. 4a also illustrates how the first and second platforms 11, 12 and the first and second side members 21, 22 may be assembled, injection molded, and/or over molded to provide different regions of rigidity and flexibility, which structures may be formed of various compositions to provide desired properties such as strength, elasticity, and rigidity. The clipless pedal platform adapter 2a may be manufactured utilizing any suitable process or technique, such as injection molding, over molding, and/or 3D printing. In one aspect, the platform 11 can be formed of a rigid structure 100. In this case, the rigid structure can provide mechanical rigidity to the adapter 2a during use. This can be accomplished by choice of thickness and materials.

FIG. 4b illustrates a clipless platform adapter 2b similar to that shown in FIG. 4a having a single pedal engagement feature 60 as opposed to a pair of complimentary pedal engagement features 60 (FIG. 4a).

FIG. 4c illustrates a clipless pedal platform adapter 2c in accordance with another example of the present disclosure. In this case, the outer sides of the first and second platforms 11, 12 can optionally comprise traction features 50 to interface with a shoe tread. The traction features 50 can comprise any suitable traction enhancing feature or material, such as protrusions 51 and/or recesses 52. A traction enhancing protrusion can have any suitable shape or configuration. In one aspect, protrusions can comprise spikes, as shown in FIG. 4c. A traction enhancing recess can likewise have any suitable shape or configuration. In one aspect, recesses can have a hexagonal shape, as shown in FIG. 4c. Other traction features can optionally be used as in FIG. 4a. Traction features and materials can be included in any combination and in any suitable arrangement on an outer side of the platforms 11, 12 and/or the side members 21, 22. In some embodiments, an outer side of one or more living hinges 40 can include a traction enhancing feature and/or material.

FIG. 4c also illustrates how the first and second platforms 11, 12 and the first and second side members 21, 22 may be assembled, injection molded, and/or over molded to provide different regions of rigidity and flexibility using a combination of flexible structures 100 (e.g., made of material forming the living hinges 40) and relatively inflexible or rigid structures (e.g., support plates) 101, 102, 103, which structures may be formed of various compositions to provide desired properties such as strength, elasticity, and rigidity. The clipless pedal platform adapter 2c may be manufactured utilizing any suitable process or technique, such as injection molding, over molding, and/or 3D printing. The inflexible or rigid support plate structures 101, 102, 103 can have any suitable relationship with a flexible structure 100. For example, the support plates 101, 102, 103 can be in a middle portion of the flexible structure 100 (e.g., "sandwiched" as illustrated) or the support plates 101, 102, 103 can be located to one side relative to a flexible structure (e.g., the support plates 101, 102, 103 on an outer or inner side of a platform or side member and the flexible structure 100 on the other side).

Figure 5A:
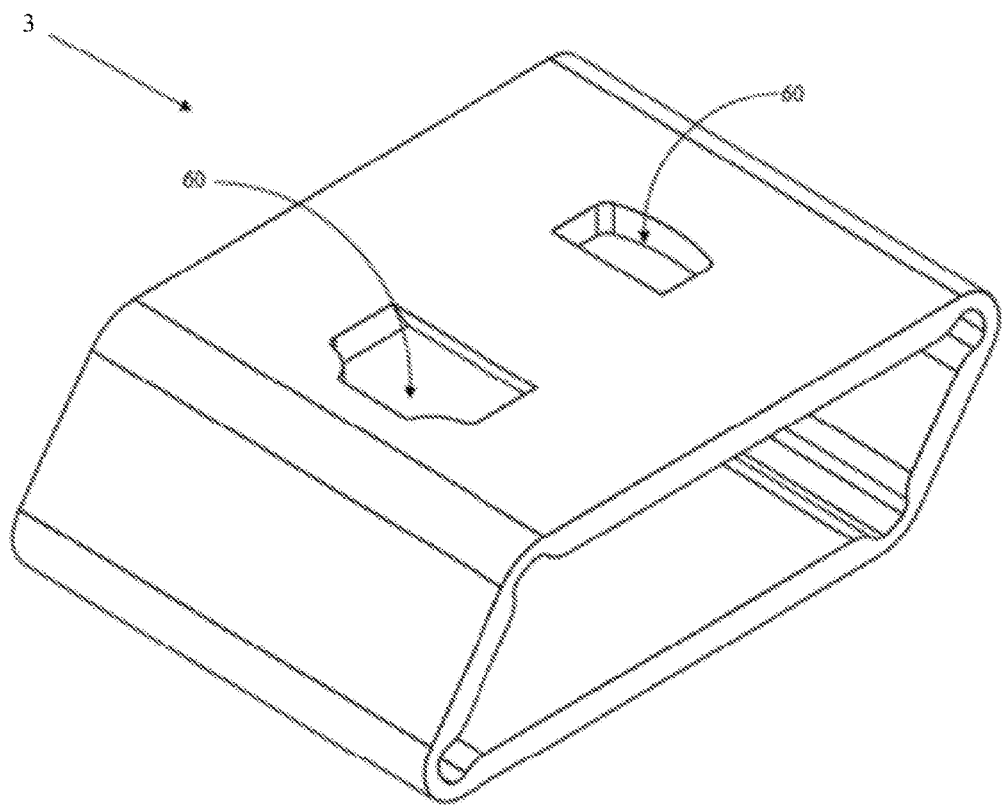
FIG. 5a is a perspective view of a clipless pedal platform adapter in accordance with an example of the present disclosure.
Figure 5B:
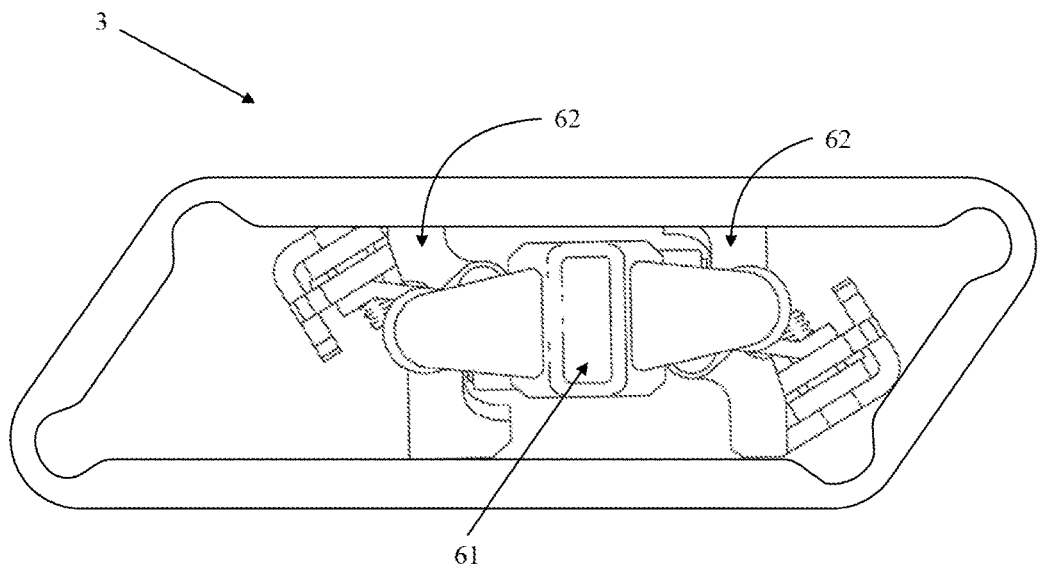
FIG. 5b is a side view of the clipless pedal platform adapter of FIG. 5a shown with a clipless pedal.
Figure 7A:
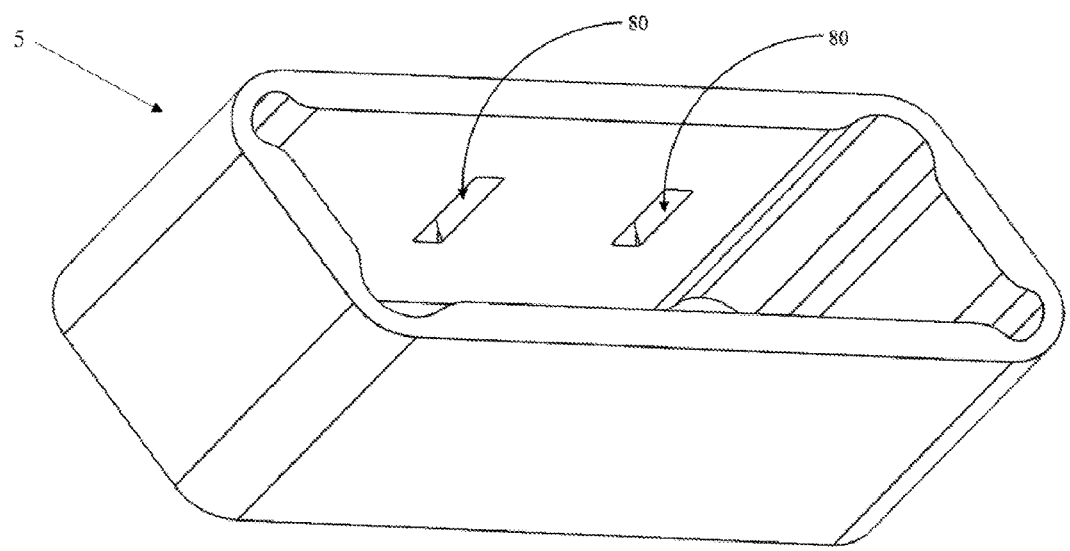
FIG. 7a is a perspective view of a clipless pedal platform adapter in accordance with an example of the present disclosure.
Figure 7B:
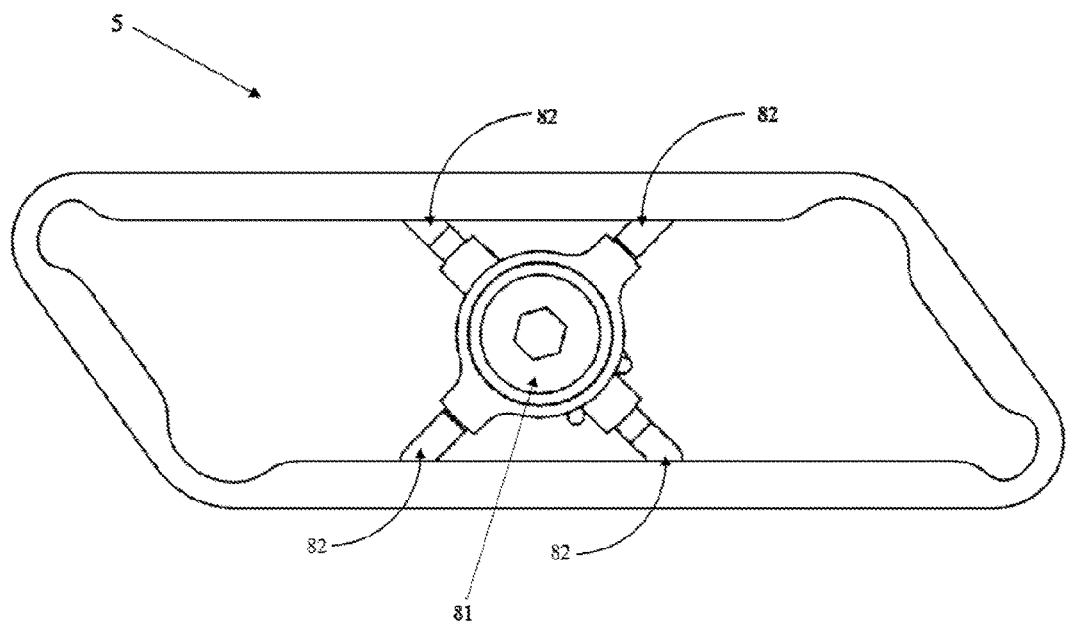
FIG. 7b is a side view of the clipless pedal platform adapter of FIG. 7a shown with a clipless pedal.
Figure 8A:
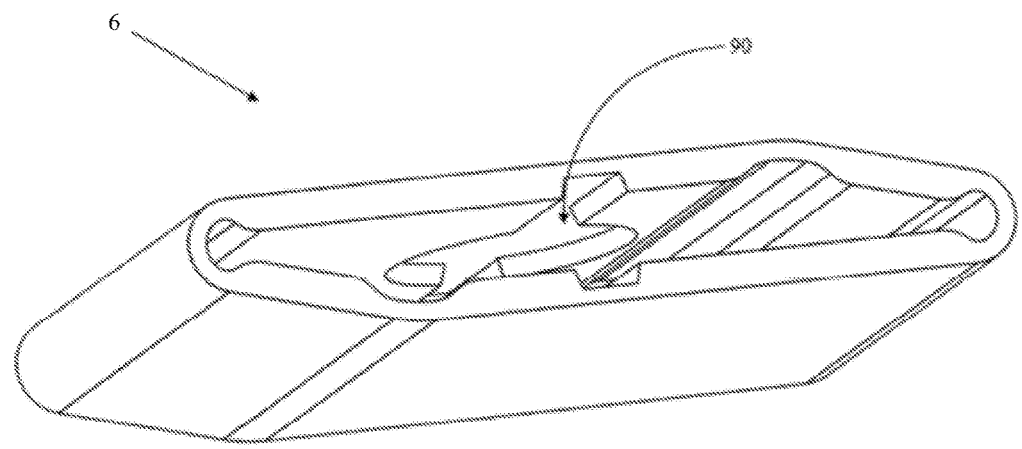
FIG. 8a is a perspective view of a clipless pedal platform adapter in accordance with an example of the present disclosure.
Figure 8B:
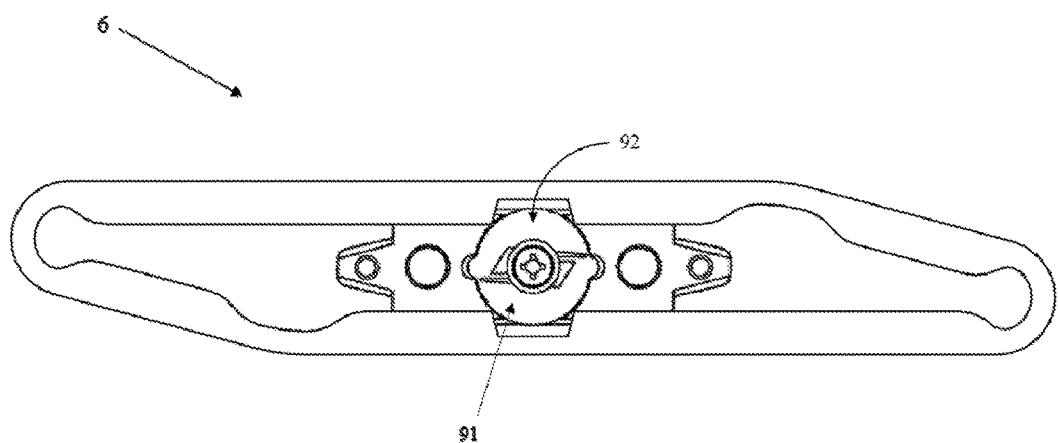
FIG. 8b is a side view of the clipless pedal platform adapter of FIG. 8a shown with a clipless pedal.
Figure 9A:
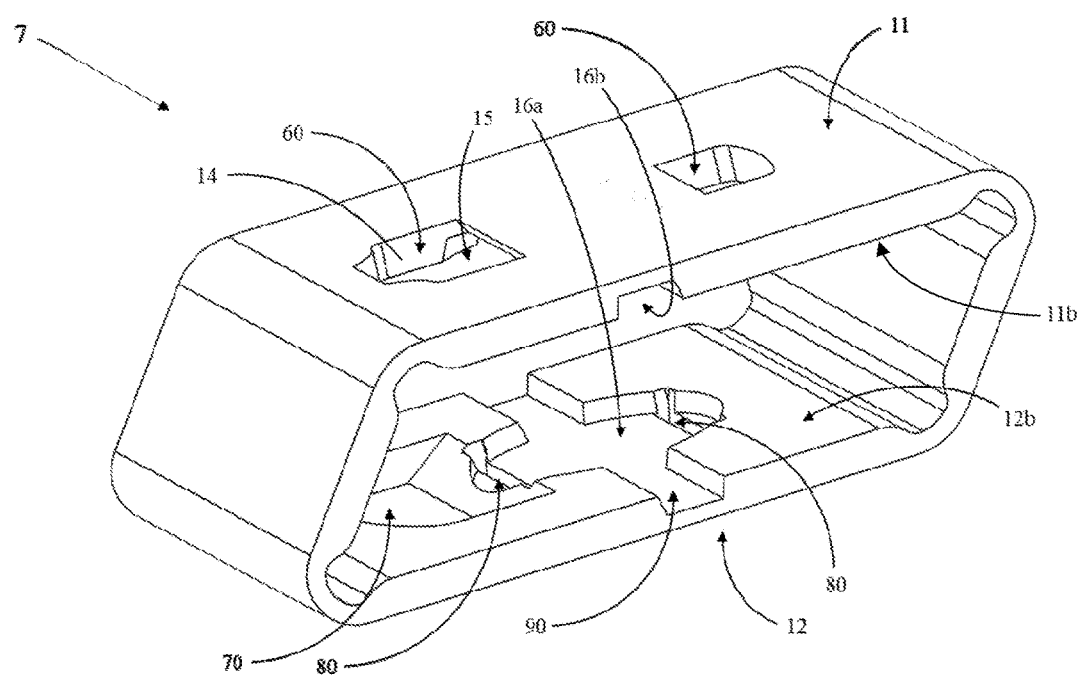
FIGS. 9a and 9b are perspective views of a clipless pedal platform adapter in accordance with an example of the present disclosure.
Figure 9B:
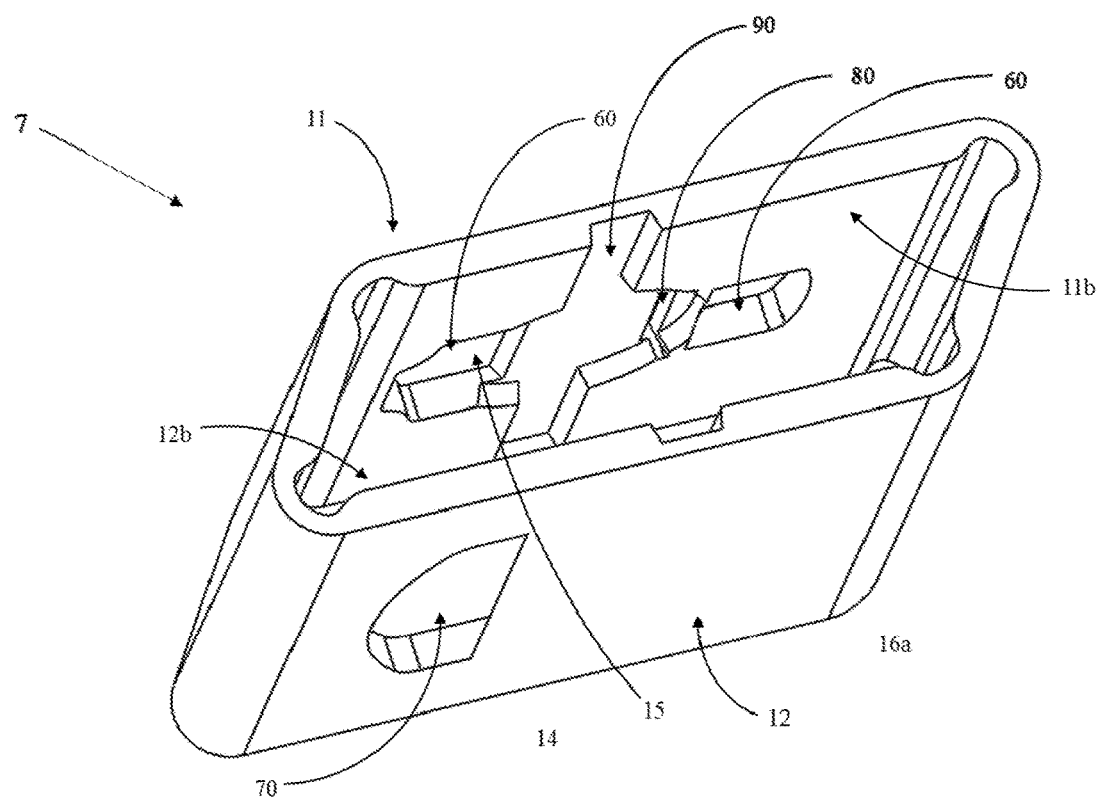

FIGS. 5a-9b illustrate clipless pedal platform adapters in accordance with several examples of the present disclosure. These clipless pedal platform adapters include various pedal engagement features to interface with, and facilitate coupling to, clipless pedals. For example, FIG. 5a shows a clipless pedal platform adapter 3 with pedal engagement features 60, FIG. 6a shows a clipless pedal platform adapter 4 with pedal engagement features 70, FIG. 7a shows a clipless pedal platform adapter 5 with pedal engagement features 80, FIG. 8a shows a clipless pedal platform adapter 6 with pedal engagement features 90. Each of the pedal engagement features 60, 70, 80, 90 is configured to interface with and engage a particular style or type of pedal. FIGS. 5b, 6b, 7b, and 8b show clipless pedals 61, 71, 81, 91 positioned within and coupled to the respective clipless pedal platform adapters 3, 4, 5, 6. FIGS. 9a and 9b show a clipless pedal platform adapter 7 that combines the various pedal engagement features 60, 70, 80, 90 into a single pedal adapter to enable coupling and interfacing with a variety of different pedals.

Figure 6A:
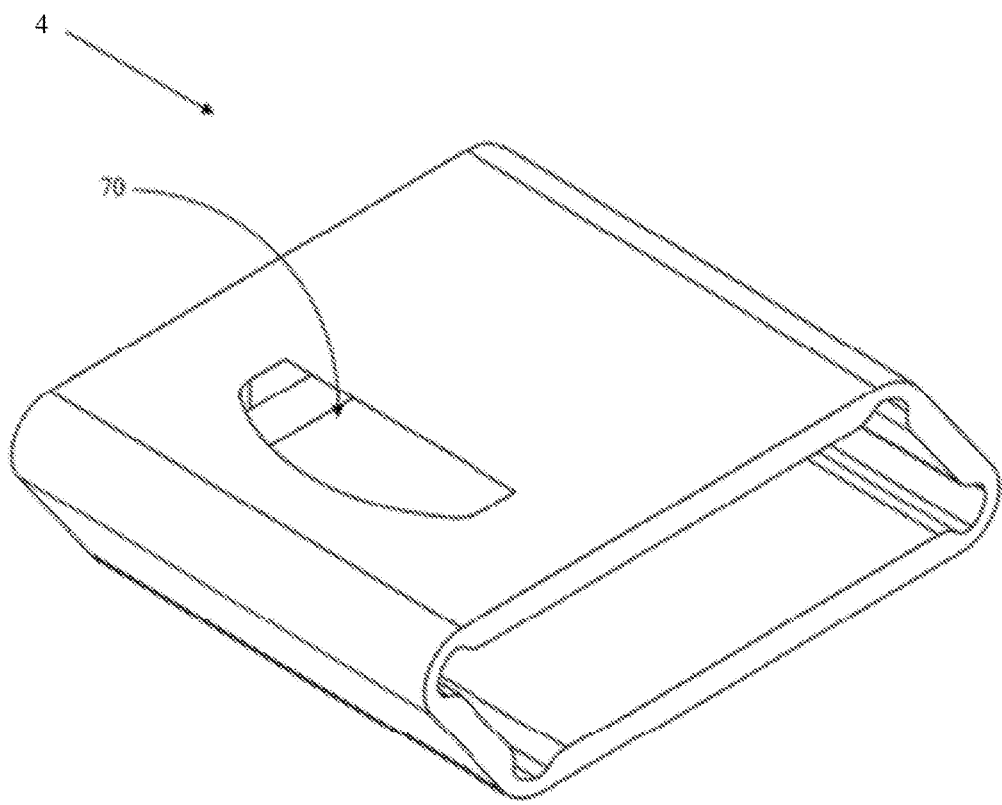
FIG. 6a is a perspective view of a clipless pedal platform adapter in accordance with an example of the present disclosure.
Figure 6B:
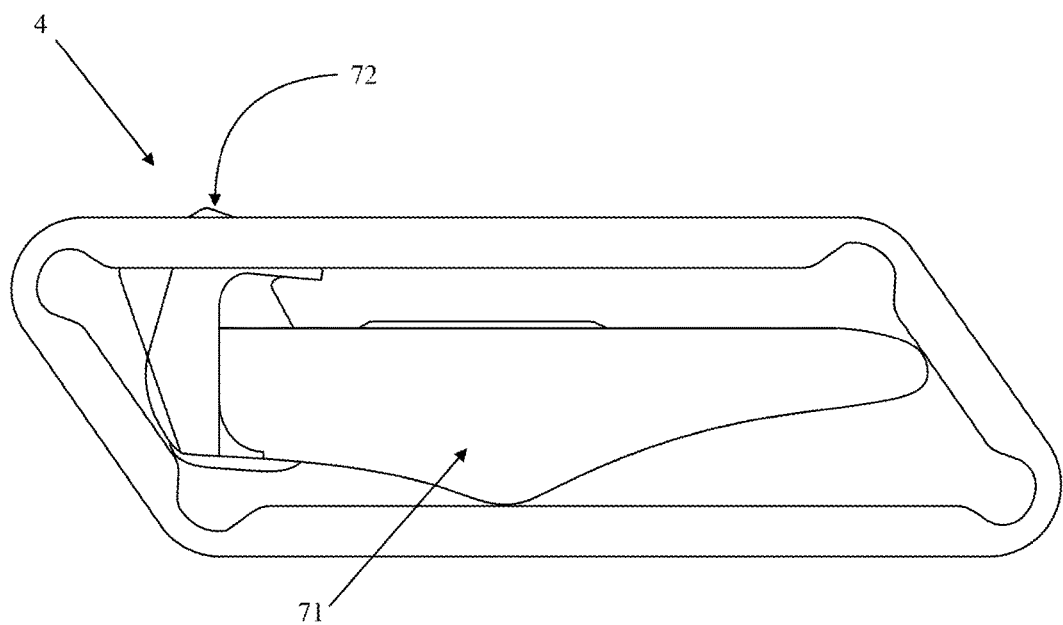
FIG. 6b is a side view of the clipless pedal platform adapter of FIG. 6a shown with a clipless pedal.

The clipless pedals 61, 71, 81, 91 include shoe coupling features 62, 72, 82, 92 configured to releasably couple the pedals to cycling shoes. The pedal engagement features 60, 70, 80, 90 can be configured to interface with such shoe coupling features 62, 72, 82, 92 to facilitate coupling the clipless pedal platform adapters 3, 4, 5, 6 to the respective clipless pedals 61, 71, 81, 91. FIGS. 5a-8b show several variations of pedal engagement features, although other pedal variations can readily be accommodated. FIGS. 5a and 7a show examples of pedal engagement features 60, 80 for exemplary mountain bike clipless pedals 61, 81, respectively. FIGS. 6a and 8a show examples of pedal engagement features 70, 90 for exemplary road bike clipless pedals 71, 91, respectively. The clipless pedal platform adapter 7 of FIGS. 9a and 9b is configured to combine all of the pedal engagement interface features 60, 70, 80, 90 in one multi-interface clipless pedal platform adapter.

For simplicity, the pedal engagement features 60, 70, 80, 90 are discussed with reference to FIGS. 9a and 9b, which combines all of these pedal engagement features in a single clipless pedal platform adapter 7. As shown in these figures, the first and second platforms 11, 12 can comprise the pedal engagement features 60, 70, 80, 90. In some embodiments, the first and second side members 21, 22 can include pedal engagement features. The pedal engagement features 60, 70, 80, 90 can comprise any suitable feature or structure configured to interface with a shoe coupling feature 62, 72, 82, 92 of the respective clipless pedals. For example, the pedal engagement features 60, 70, 80, 90 can comprise protrusions, recesses, and/or openings configured to interface with the respective shoe coupling features 62, 72, 82, 92. The pedal engagement features 60, 70, 80, 90 can have any suitable configuration to facilitate coupling with a given clipless pedal.

In one aspect, the pedal engagement features can comprise a protrusion on at least one of the inner sides 11b, 12b of the first and second platforms 11, 12. The protrusion can be configured to interface with a shoe coupling feature of a pedal. In another aspect, the pedal engagement features can comprise a side wall 14 defined by an engagement opening 15 in at least one of the first and second platforms 11, 12. The side wall 14 can be configured to interface with a shoe coupling feature of the pedal. The engagement opening 15 can be configured to receive at least a portion of the shoe coupling feature within the engagement opening. In one aspect, the engagement opening 15 can extend through a platform 11, 12. In another aspect, an engagement opening 16a, 16b can comprise a recess in an inner side 11b, 12b of a platform 11, 12 that does not extend through the platform.

The pedal engagement features can be configured to mate with and engage any portion of a clipless pedal, such as the shoe coupling features. Because clipless pedals and shoe coupling features are available in a variety of shapes and configurations, it should be recognized that the pedal engagement features disclosed herein can likewise have a variety of shapes and configurations, several of which are shown in the figures. With the examples provided herein it should be recognized that a clipless pedal platform adapter in accordance with the present disclosure can be configured to interface with any type of clipless pedal.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A clipless pedal platform adapter, comprising:
   first and second platforms, each platform having an outer side to interface with a user's foot and an inner side to interface with a clipless pedal, the inner sides facing one another; and
   first and second side members pivotally coupled to the first and second platforms at opposite ends of the platforms such that a distance between the platforms is variable,
   wherein the first and second platforms and the first and second side members define a pedal opening to receive the pedal, and the first and second platforms are biased toward one another to force the inner sides against the pedal thereby coupling the clipless pedal platform adapter to the pedal, and
   wherein at least one of the first and second platforms comprises a pedal engagement feature to interface with the pedal, wherein the pedal engagement feature comprises a side wall defined by an engagement opening in at least one of the first and second platforms, the side wall being configured to interface with a shoe coupling feature of the pedal that is configured to releasably couple the pedal to a cycling shoe, and the engagement opening being configured to receive at least a portion of the shoe coupling feature therein, wherein the engagement opening comprises a recess in at least one of the inner sides of the first and second platforms.

2. The clipless pedal platform adapter of claim 1, wherein the outer sides of the first and second platforms comprise traction features to interface with a shoe tread.

3. The clipless pedal platform adapter of claim 2, wherein the traction features comprise at least one of protrusions and recesses.

4. The clipless pedal platform adapter of claim 1, wherein the pedal engagement feature comprises a protrusion on at least one of the inner sides of the first and second platforms, the protrusion being configured to interface with a shoe coupling feature of the pedal that is configured to releasably couple the pedal to a cycling shoe.

5. The clipless pedal platform adapter of claim 1, wherein the engagement opening extends through at least one of the first and second platforms.

6. The clipless pedal platform adapter of claim 1, wherein the first and second platforms are similar in length.

7. The clipless pedal platform adapter of claim 6, wherein the first and second side members are similar in length such that the clipless pedal platform adapter has a parallelogram shape when the pedal opening is defined.

8. The clipless pedal platform adapter of claim 7, wherein the parallelogram shape is a rhomboid, rhombus, rectangle, or a square.

9. The clipless pedal platform adapter of claim 1, wherein at least one of the first and second side members is pivotally coupled to at least one of the first and second platforms via a living hinge that biases the first and second platforms toward one another.

10. The clipless pedal platform adapter of claim 9, wherein the first side member and the first platform are oriented at an angle greater than 90 degrees relative to one another by the living hinge in an undeflected condition.

11. The clipless pedal platform adapter of claim 10, wherein the living hinge has a straight configuration in an undeflected condition such that the first side member and the first platform are coplanar.

12. The clipless pedal platform adapter of claim 10, wherein the first side member, the living hinge, and the first platform are integrally formed with one another.

13. The clipless pedal platform adapter of claim 9, wherein the first side member and the first platform are oriented at an angle less than 90 degrees relative to one another by the living hinge in an undeflected condition.

14. The clipless pedal platform adapter of claim 13, wherein the living hinge has a curved configuration in an undeflected condition.

15. The clipless pedal platform adapter of claim 14, wherein the curved configuration of the living hinge is a semi-circular configuration that orients the first side member and the first platform parallel to one another.

16. The clipless pedal platform adapter of claim 13, wherein the first side member, the living hinge, and the first platform are integrally formed with one another.

17. The clipless pedal platform adapter of claim 13, wherein the first side member and the first platform are secured to the living hinge via a fastening mechanism.

18. The clipless pedal platform adapter of claim 9, wherein the first side member, the first platform, and the living hinge are formed of a polymeric material, a fiber reinforced composite material, a metal material, a magnetic material, or a combination thereof.

19. A pedal system, comprising:
 a clipless pedal; and
 the clipless pedal platform adapter of claim 1 coupled to the clipless pedal.

20. The pedal system of claim 19, wherein the clipless pedal comprises a shoe coupling feature to releasably couple the pedal to a cycling shoe.

21. A clipless pedal platform adapter, comprising:
 first and second platforms, each platform having an outer side to interface with a user's foot and an inner side to interface with a clipless pedal, the inner sides facing one another; and
 first and second side members pivotally coupled to the first and second platforms at opposite ends of the platforms such that a distance between the platforms is variable,
 wherein the first and second platforms and the first and second side members define a pedal opening to receive the pedal, and the first and second platforms are biased toward one another to force the inner sides against the pedal thereby coupling the clipless pedal platform adapter to the pedal,
 wherein at least one of the first and second side members is pivotally coupled to at least one of the first and second platforms via a living hinge that biases the first and second platforms toward one another, wherein the first side member and the first platform are oriented at an angle greater than 90 degrees relative to one another by the living hinge in an undeflected condition.

22. The clipless pedal platform adapter of claim 21, wherein the living hinge has a straight configuration in an undeflected condition such that the first side member and the first platform are coplanar.

23. The clipless pedal platform adapter of claim 21, wherein the first side member, the living hinge, and the first platform are integrally formed with one another.

24. The clipless pedal platform adapter of claim 21, wherein at least one of the first and second platforms comprises a pedal engagement feature to interface with the pedal and the pedal engagement feature comprises:
 a protrusion on at least one of the inner sides of the first and second platforms, the protrusion being configured to interface with a shoe coupling feature of the pedal that is configured to releasably couple the pedal to a cycling shoe; or
 a side wall defined by an engagement opening in at least one of the first and second platforms, the side wall being configured to interface with a shoe coupling feature of the pedal that is configured to releasably couple the pedal to a cycling shoe, and the engagement opening being configured to receive at least a portion of the shoe coupling feature therein.

25. The clipless platform adapter of claim 21, wherein the first and second platforms are similar in length and wherein the first and second side members are similar in length such that the clipless pedal platform adapter has a parallelogram shape when the pedal opening is defined.

\* \* \* \* \*